United States Patent
Yamamoto et al.

(10) Patent No.: US 12,534,616 B2
(45) Date of Patent: *Jan. 27, 2026

(54) COMPOSITION AND MEDICAL DEVICE WITH CURED FILM

(71) Applicants: FUJIFILM Corporation, Tokyo (JP); KYUSHU UNIVERSITY, NATIONAL UNIVERSITY CORPORATION, Fukuoka (JP)

(72) Inventors: Yosuke Yamamoto, Minami-ashigara (JP); Yuta Shigenoi, Minami-ashigara (JP); Atsushi Sugasaki, Minami-ashigara (JP); Masaru Tanaka, Fukuoka (JP); Shingo Kobayashi, Fukuoka (JP)

(73) Assignees: FUJIFILM Corporation, Tokyo (JP); Kyushu University, National University Corporation, Fukuoka (JP)

(*) Notice: Subject to any disclaimer, the term of this patent is extended or adjusted under 35 U.S.C. 154(b) by 1104 days.

This patent is subject to a terminal disclaimer.

(21) Appl. No.: 17/369,167

(22) Filed: Jul. 7, 2021

(65) Prior Publication Data

US 2021/0332239 A1 Oct. 28, 2021

Related U.S. Application Data

(63) Continuation of application No. PCT/JP2020/001582, filed on Jan. 17, 2020.

(30) Foreign Application Priority Data

Jan. 23, 2019 (JP) .................. 2019-009550

(51) Int. Cl.
| | | |
|---|---|---|
| C08L 75/16 | (2006.01) | |
| A61L 27/34 | (2006.01) | |
| A61L 31/10 | (2006.01) | |
| C08J 5/18 | (2006.01) | |

(52) U.S. Cl.
CPC ............... *C08L 75/16* (2013.01); *A61L 27/34* (2013.01); *A61L 31/10* (2013.01); *C08J 5/18* (2013.01); *A61L 2420/02* (2013.01); *C08L 2203/02* (2013.01); *C08L 2203/16* (2013.01)

(58) Field of Classification Search
CPC ......... C08L 33/00; C08L 33/06; C08L 33/08; C08L 33/10; C08L 33/14; C08L 33/24; C08L 33/26; C08L 75/16; C08L 2203/02; C08L 2203/16; C09D 133/00; C09D 133/04; C09D 133/08; C09D 133/10; C09D 133/26; C09D 175/04; C08J 5/18; A61L 27/34; A61L 31/10; A61L 2420/02
See application file for complete search history.

(56) References Cited

U.S. PATENT DOCUMENTS

| | | | |
|---|---|---|---|
| 2010/0113871 A1 | 5/2010 | Dias et al. | |
| 2010/0160557 A1* | 6/2010 | Murofushi | C08G 18/3853 560/221 |
| 2011/0059874 A1 | 3/2011 | Rooijmans et al. | |
| 2012/0101184 A1 | 4/2012 | Wang et al. | |
| 2017/0226251 A1 | 8/2017 | Fukagawa | |
| 2017/0335076 A1* | 11/2017 | Hatakeyama | H01B 5/16 |

FOREIGN PATENT DOCUMENTS

| | | | |
|---|---|---|---|
| JP | 2003045830 A | * | 2/2003 |
| JP | 2010-503737 A | | 2/2010 |
| JP | 2011-513566 A | | 4/2011 |
| JP | 2013-506718 A | | 2/2013 |
| WO | 2016/067795 A1 | | 5/2016 |

OTHER PUBLICATIONS

Karenz MOI information sheet downloaded from https://www.resonac.com/products/innovation-materials/special/110/11433.html (Year: 2024).*
International Search Report dated Mar. 31, 2020, issued by the International Searching Authority in application No. PCT/JP2020/001582.
Written Opinion dated Mar. 31, 2020, issued by the International Searching Authority in application No. PCT/JP2020/001582.
International Preliminary Report on Patentability (with translation of the Written Opinion) dated Jul. 27, 2021, issued by the International Bureau in application No. PCT/JP2020/001582.
Notice of Reasons for Refusal dated May 10, 2022 from the Japanese Patent Office in Japanese Application No. 2020-568130.

* cited by examiner

*Primary Examiner* — Jeffrey S Lenihan
(74) *Attorney, Agent, or Firm* — Sughrue Mion, PLLC

(57) ABSTRACT

The present invention provides a composition which is used to form a cured film that is disposed on a medical device and a medical device with a cured film, which are capable of suppressing both the adhesion of platelets and the adhesion of cells. A composition according to the embodiment of the present invention is a composition which is used to form a cured film that is disposed on a medical device, and which contains a compound represented by Formula (1).

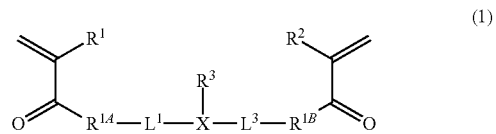

8 Claims, No Drawings

COMPOSITION AND MEDICAL DEVICE WITH CURED FILM

CROSS-REFERENCE TO RELATED APPLICATIONS

This application is a Continuation of PCT International Application No. PCT/JP2020/001582 filed on Jan. 17, 2020, which claims priority under 35 U.S.C. § 119(a) to Japanese Patent Application No. 2019-009550 filed on Jan. 23, 2019. The above application is hereby expressly incorporated by reference, in its entirety, into the present application.

BACKGROUND OF THE INVENTION

1. Field of the Invention

The present invention relates to a composition and a medical device with a cured film.

2. Description of the Related Art

In many medical devices, such as catheters, indwelling needles, guide wires, stents, endoscopes, cannulas, and syringes, an outer surface thereof is generally subjected to various kinds of coating treatment (coating film). By being subjected to such coating treatment, effects such as easy insertion of a medical device into the body or easy drainage of body fluid from the body can be obtained.

For example, JP2011-513566A discloses a hydrophilic coating formulation containing a polyfunctional polymerizable compound having a large number of acrylamide-based functional groups, and describes that firm and uniform coating having good abrasion resistance can be provided. In the column of Example of JP2011-513566A, a polyfunctional polymerizable compound (polyethylene glycol (PEG) 1500 diacrylamide) is specifically used.

SUMMARY OF THE INVENTION

Meanwhile, in the coating film (coating) applied to various medical devices as described above, various properties are required, in addition to the abrasion resistance as described in JP2011-513566A.

For example, antithrombotic properties are required, which requires suppression of adhesion of platelets, proteins, and cells.

Therefore, an object of the present invention is to provide a composition which is used to form a cured film that is disposed on a medical device and a medical device with a cured film, which are capable of suppressing all the adhesion of platelets, the adhesion of proteins, and the adhesion of cells.

As a result of diligent studies to solve the above problems, the present inventors have found that the above problems can be solved with a composition containing a compound represented by Formula (1) described later, and have completed the present invention.

That is, the present invention is the following [1] to [8].

[1] A composition which is used to form a cured film that is disposed on a medical device, the composition comprising:
a compound represented by Formula (1) described later.

[2] The composition according to [1], in which $R^3$ is an alkyl group.

[3] The composition according to [1] or [2], in which $R^3$ is an alkyl group having 4 or less carbon atoms.

[4] The composition according to any one of [1] to [3], in which $R^{1A}$ and $R^{1B}$ are an oxygen atom.

[5] The composition according to any one of [1] to [4], in which X is a nitrogen atom.

[6] The composition according to any one of [1] to [5], in which the compound represented by Formula (1) is one selected from the group consisting of compounds represented by Formulae (1-1) to (1-3) described later.

[7] A medical device with a cured film, comprising:
a medical device; and
a cured film disposed on the medical device and formed of the composition according to any one of [1] to [6].

[8] The medical device with a cured film according to [7], in which the cured film is an antithrombotic film.

According to the present invention, it is possible to provide a composition which is used to form a cured film that is disposed on a medical device and a medical device with a cured film, which are capable of suppressing both the adhesion of platelets and the adhesion of cells.

DESCRIPTION OF THE PREFERRED EMBODIMENTS

In the present specification, the range expressed by using "to" includes both values described before and after "to". For example, the range expressed by "A to 13" includes A and B.

In the present specification, the solid content is intended to be a component which is contained in the composition excluding the solvent component, and the component is calculated as a solid content even in a case of liquid.

The mechanism by which a medical device with a cured film according to the embodiment of the present invention can suppress all the adhesion of platelets, the adhesion of proteins, and the adhesion of cells is not clear, but is roughly as follows.

The adhesion of platelets and the adhesion of various cells are performed via proteins in body tissue fluid adsorbed onto the surface of the member. It is also known that the structure of the protein changes due to the adsorption and cell adhesion sites which may be recognized as scaffolds by various cells are exposed, thereby making the adhesion of cells possible. It is considered that the characteristic (mechanism) of the present invention is due to the fact that the structure derived from a compound (1) in the cured film suppresses the adsorption of the protein in plasma onto the surface, or the structure change of the adsorbed protein.

[Composition which is Used to Form Cured Film that is Disposed on Medical Device]

The cured film that is disposed on the medical device according to the embodiment of the present invention is a cured film which is formed of a composition (hereinafter, sometimes referred to as a "cured film-forming composition according to the embodiment of the present invention") containing a compound represented by Formula (I) (hereinafter, sometimes referred to as a "compound (1)") described later.

<Compound Represented by Formula (1)>

A compound represented by Formula (1) [compound (1)] will be described.

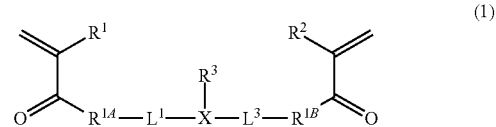

In Formula (1), the meaning of each symbol is as follows.

$R^1$ and $R^2$ each independently represent a hydrogen atom or an alkyl group, preferably a hydrogen atom or an alkyl group having 4 or less carbon atoms, more preferably a hydrogen atom, a methyl group, an ethyl group, a propyl group, or a propan-2-yl group, still more preferably a hydrogen atom or a methyl group, and even still more preferably a methyl group.

$R^3$ represents a hydrogen atom or a monovalent substituent, preferably a hydrogen atom, an alkyl group, an aryl group, or a group represented by Formula (2), more preferably a hydrogen atom, an alkyl group, a phenyl group, or a group represented by Formula (2), still more preferably an alkyl group, and even still more preferably an alkyl group having 4 or less carbon atoms. Examples of an alkyl group having 4 or less carbon atoms include a methyl group, an ethyl group, a propyl group, and a propan-2-yl group, but the present invention is not limited thereto. As an alkyl group having 4 or less carbon atoms, an ethyl group or a methyl group is preferable, and a methyl group is more preferable.

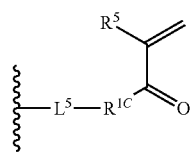

(2)

The meaning of each symbol in Formula (2) is as follows.

In Formula (2), $R^5$ represents a hydrogen atom or an alkyl group, preferably a hydrogen atom or an alkyl group having 4 or less carbon atoms, more preferably a hydrogen atom, a methyl group, an ethyl group, a propyl group, or a propan-2-yl group, and still more preferably a hydrogen atom or a methyl group.

In Formula (2), $R^{1C}$ represents an oxygen atom or $-NR^{103}-$. $R^{103}$ represents a hydrogen atom or an alkyl group, preferably a hydrogen atom or an alkyl group having 4 or less carbon atoms, more preferably a hydrogen atom, a methyl group, an ethyl group, a propyl group, or a propan-2-yl group, still more preferably a hydrogen atom or a methyl group, and even still more preferably a hydrogen atom. $R^{1C}$ is preferably an oxygen atom (—O—) or —NH—, and more preferably an oxygen atom (—O—).

In Formula (2), $L^5$ represents an aliphatic hydrocarbon group which contains a urethane bond represented by —NH—COO—*2 and which may contain an ether bond, and is preferably *2-$(CH_2)_j$—OCO—NH—$[(CH_2)_k$—O$]_k$—$(CH_2)_i$. Here, i, j, and l each independently are an integer of 1 or more, preferably an integer of 1 to 3, and more preferably 2 or 3. k is an integer of 0 or more, preferably an integer of 0 to 3, and more preferably 0 or 1.

The urethane bond in the aliphatic hydrocarbon group represented by $L^5$ is disposed such that *2 is on the X side.

The meaning of each symbol in Formula (1) is as follows.

$R^{1A}$ and $R^{1B}$ each independently represent an oxygen atom or $-NR^{101}-$.

$R^{101}$ represents a hydrogen atom or an alkyl group, preferably a hydrogen atom or an alkyl group having 4 or less carbon atoms, more preferably a hydrogen atom, a methyl group, an ethyl group, a propyl group, or a propan-2-yl group, and still more preferably a hydrogen atom or a methyl group.

$R^{1A}$ and $R^{1B}$ each independently are preferably an oxygen atom (—O—) or —NH—, and more preferably an oxygen atom (—O—).

$L^1$ and $L^3$ each independently represent an aliphatic hydrocarbon group which contains a urethane bond represented by —NH—COO—*1 and which may contain an ether bond.

$L^1$ is preferably —$(CH_2)_p$—[O—$(CH_2)_r]_t$—NH—COO—$(CH_2)_v$—*2. *2 side is bonded with X. Here, p, r, and v each independently are an integer of 1 or more, preferably an integer of 1 to 3, and more preferably 2 or 3. t is an integer of 0 or more, preferably an integer of 0 to 3, and more preferably 0 or 1.

$L^3$ is preferably *3-$(CH_2)_w$—OCO—NH—$[(CH_2)_s$—O$]_u$—$(CH_2)_q$—. *3 side is bonded with X. Here, q, s, and w each independently are an integer of 1 or more, preferably an integer of 1 to 3, and more preferably 2 or 3. u is an integer of 0 or more, preferably an integer of 0 to 3, and more preferably 0 or 1.

The urethane bond in the aliphatic hydrocarbon group represented by $L^1$ is disposed such that *2 is on the X side. Further, the urethane bond in the aliphatic hydrocarbon group represented by $L^3$ is disposed such that *3 is on the X side.

X represents a nitrogen atom or $>CR^{102}-$, and is preferably a nitrogen atom.

$R^{102}$ represents a hydrogen atom or a monovalent substituent, preferably a hydrogen atom or an alkyl group, more preferably a hydrogen atom or an alkyl group having 4 or less carbon atoms, still more preferably a hydrogen atom, a methyl group, an ethyl group, a propyl group, or a propan-2-yl group, and even still more preferably a hydrogen atom or a methyl group.

$>CR^{102}-$ is a group represented by Formula (Y). In Formula (Y), * represents a bonding position.

(Y)

Specific Examples of Compound Represented by Formula (1)

Specific examples of the compound (1) include a compound represented by Formula (1-1) (hereinafter, sometimes referred to as a "compound (1-1)"), a compound represented by Formula (1-2) (hereinafter, sometimes referred to as a "compound (1-2)"), a compound represented by Formula (1-3) (hereinafter, sometimes referred to as a "compound (1-3)"), a compound represented by Formula (1-4) (hereinafter, sometimes referred to as a "compound (1-4)"), a compound represented by Formula (1-5) (hereinafter, sometimes referred to as a "compound (1-5)"), and a compound represented by Formula (1-6) (hereinafter, sometimes referred to as a "compound (1-6)"), but the present invention is not limited thereto.

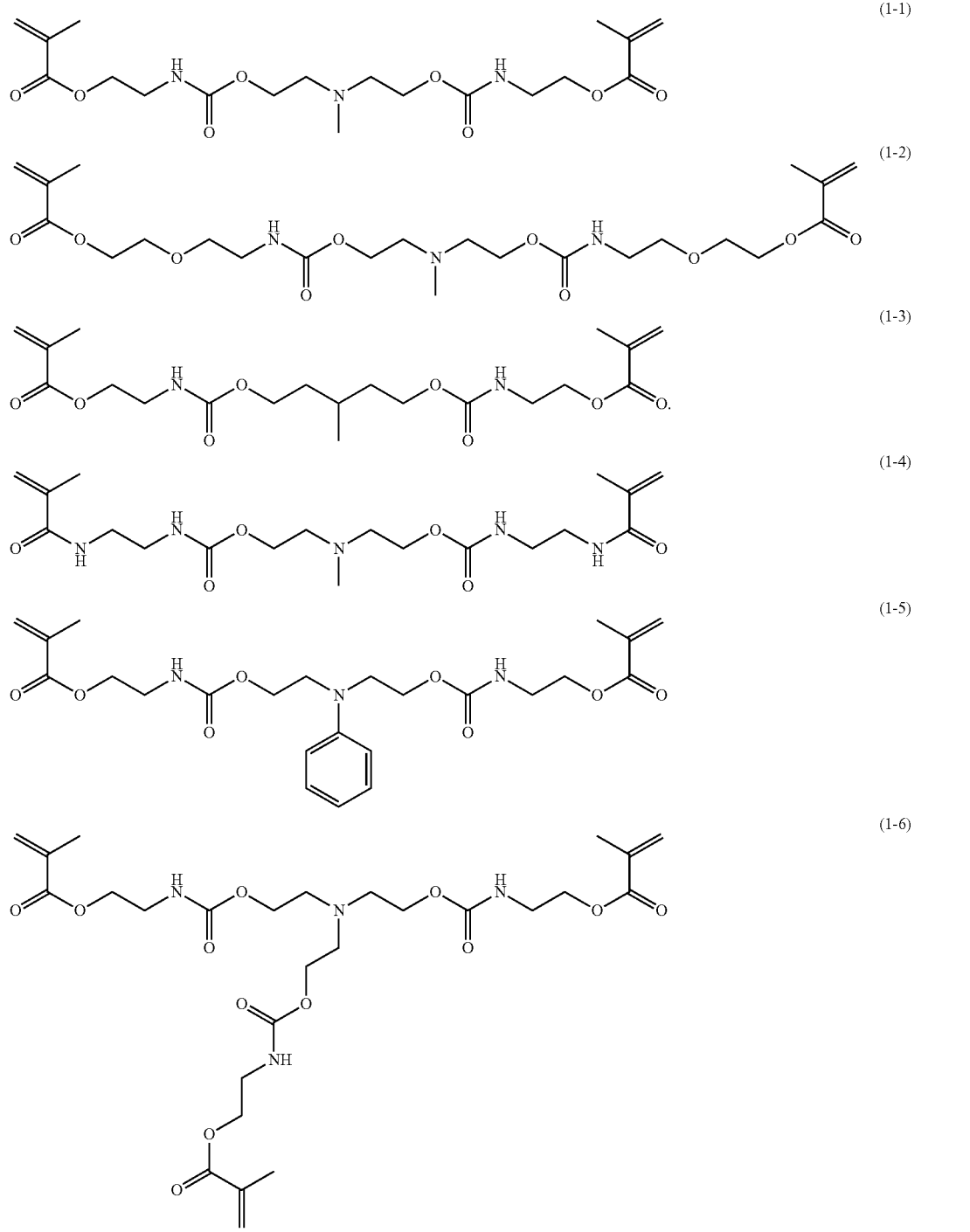

Preferred Example of Compound Represented by Formula (1)

As the compound (1) contained in the cured film-forming composition according to the embodiment of the present invention, at least one selected from the group consisting of the compound (1-1), the compound (1-2), and the compound (1-3) is preferable.

In a case where the compound (1) contained in the cured film-forming composition according to the embodiment of the present invention is at least one selected from the group consisting of the compound (1-1), the compound (1-2), and the compound (1-3), the adhesion of platelets and the adhesion of fibroblasts are further suppressed.

Content of Compound Represented by Formula (1)

The content of the compound represented by Formula (1) in the cured film-forming composition is not particularly limited, but is preferably 50% by mass or more, more preferably 75% by mass or more, still more preferably 85% by mass or more, and even still more preferably 95% by mass or more, with respect to the total mass of the solid content of the cured film-forming composition according to the embodiment of the present invention.

The upper limit of the content of the compound represented by Formula (1) in the cured film-forming composition according to the embodiment of the present invention is not particularly limited, but usually, is preferably less than 100% by mass, and more preferably 99.9% by mass or less, with respect to the total mass of the solid content of the cured film-forming composition according to the embodiment of the present invention.

Method of Synthesizing Compound (1)

The compound (1) can be easily synthesized by a conventionally known method.

Components Other than Compound (1)

The cured film-forming composition according to the embodiment of the present invention may further contain components other than the compound (1), such as a monomer other than the compound (1), a surfactant, a polymerization initiator, a polymerization inhibitor, and a solvent, in addition to the compound (1) described above, as long as the effects of the present invention are not hindered.

Monomer Other than Compound (1)

In the cured film-forming composition according to the embodiment of the present invention, a commercially available monofunctional monomer and/or polyfunctional monomer may be used in combination with the compound represented by Formula (1), in order to adjust the mechanical properties (tensile strength, abrasion resistance, or the like) of the cured film.

In a case where the cured film-forming composition according to the embodiment of the present invention contains a monomer other than the compound (1), the content of the monomer other than the compound (1) in the cured film-forming composition according to the embodiment of the present invention is not particularly limited, but is preferably more than 0% by mass and 40% by mass or less with respect to the total mass of the solid content of the cured film-forming composition according to the embodiment of the present invention. In a case where the content of the monomer other than the compound (1) is 0% by mass, which means that the cured film-forming composition according to the embodiment of the present invention does not contain any monomer other than the compound (1).

<<Surfactant>>

A commercially available surfactant may be added to the cured film-forming composition according to the embodiment of the present invention in order to adjust the wettability and the levelability of the cured film-forming composition to a substrate.

In a case where the cured film-forming composition according to the embodiment of the present invention contains a surfactant, the content of the surfactant in the cured film-forming composition according to the embodiment of the present invention is not particularly limited, but is preferably more than 0% by mass and 3% by mass or less with respect to the total mass of the solid content of the cured film-forming composition according to the embodiment of the present invention. In a case where the content of the surfactant is 0% by mass, which means that the cured film-forming composition according to the embodiment of the present invention does not contain the surfactant.

<<Polymerization Initiator>>

The polymerization initiator is not particularly limited, and examples thereof include photopolymerization initiators such as a photo-radical polymerization initiator, a photo-cationic polymerization initiator, and a photo-anionic polymerization initiator, and thermal polymerization initiators such as a thermal radical polymerization initiator and a thermal cationic polymerization initiator.

In a case where the cured film-forming composition according to the embodiment of the present invention contains a polymerization initiator, the content of the polymerization initiator in the cured film-forming composition according to the embodiment of the present invention is not particularly limited, but is preferably 0.1% by mass to 10% by mass, more preferably 0.5% by mass to 8% by mass, and still more preferably 1% by mass to 5% by mass, with respect to the total mass of the solid content of the cured film-forming composition according to the embodiment of the present invention.

<<Polymerization Inhibitor>>

A commercially available polymerization inhibitor may be added to the cured film-forming composition according to the embodiment of the present invention in order to impart storage stability to the compound (1) and the cured film-forming composition.

In a case where the cured film-forming composition according to the embodiment of the present invention contains a polymerization inhibitor, the content of the polymerization inhibitor in the cured film-forming composition according to the embodiment of the present invention is not particularly limited, but is preferably 0.0005% by mass to 1% by mass with respect to the total mass of the solid content of the cured film-forming composition according to the embodiment of the present invention.

<<Solvent>>

A solvent is not particularly limited, but is preferably alcohol, ketone, or a mixed solvent thereof, more preferably alcohol having 3 or less carbon atoms, ketone having 4 or less carbon atoms or a mixed solvent thereof, and still more preferably methanol or acetone.

In a case where the cured film-forming composition contains a solvent, the content of the solvent in the cured film-forming composition is not particularly limited, but is preferably 10% by mass to 95% by mass, and more preferably 30% by mass to 90% by mass, and still more preferably 50% by mass to 80% by mass, of the cured film-forming composition.

[Medical Device with Cured Film]

A medical device with a cured film according to the embodiment of the present invention (hereinafter, sometimes referred to as a "medical device according to the embodiment of the present invention") includes a medical device and a cured film disposed on the medical device and formed of the cured film-forming composition according to the embodiment of the present invention.

<Medical Device>

The medical device is not particularly limited, but examples thereof include a cardiopulmonary bypass, an artificial kidney, vascular prosthesis, a prosthetic valve, a hemodialysis membrane, a catheter, a blood filter, a blood storage pack, a platelet storage pack, a blood circuit, an indwelling needle, a guide wire, a stent, an endoscope, a cannula, and an artificial organ.

<Cured Film>

A cured film is a film disposed on the medical device, and formed of the cured film-forming composition according to the embodiment of the present invention.

A method of disposing the cured film on the medical device is not particularly limited, but examples thereof include a method of disposing the cured film-forming composition according to the embodiment of the present invention on the surface of the medical device (indicating a surface that may come into contact with blood, body fluid, or tissue fluid) and forming a cured film precursor film on the surface of the medical device to cure the film.

The method of disposing the cured film-forming composition according to the embodiment of the present invention on the surface of the medical device is not particularly limited, but examples thereof include a method using a bar coater, spin coating, dipping, painting, or the like.

The surface of the medical device may be subjected to surface treatment such as plasma treatment or ozone treatment before the cured film-forming composition according to the embodiment of the present invention is disposed. Further, the surface of the medical device may be coated.

The method of forming a cured film by curing the cured film precursor film formed on the surface of the medical device is not particularly limited, but it is preferable to cure the film by light irradiation or heating, and more preferable to cure the film by light irradiation. In particular, in a case where the materials of the medical device have low heat resistance, it is preferable to cure the film by light irradiation. The light irradiation may be appropriately selected from visible light rays, ultraviolet rays, electron rays, gamma rays, and the like.

The thickness of the cured film is not particularly limited, but is preferably 0.05 μm to 500 μm, more preferably 0.1 μm to 100 μm, and still more preferably 1 μm to 50 μm.

The cured film is preferably an antithrombotic film.

Since the cured film formed on the medical device according to the embodiment of the present invention suppresses the adhesion of platelets, the adhesion of proteins, and the adhesion of cells, blood clots are difficult to be formed.

EXAMPLES

Example 1

Production of Evaluation Sample

An evaluation sample (hereinafter, sometimes referred to as a "sample 1") was produced by the method described below.

1. Synthesis of Compound (1-1)

N-methyldiethanolamine (10 g, 83.9 mmol) and tetrahydrofuran (50 mL) were mixed. A solution obtained by diluting 2-isocyanatoethyl methacrylate (27.34 g, 1,176 mmol) with tetrahydrofuran (50 mL) was added dropwise to the mixed solution. Further, a solution obtained by diluting Neostann U600 (538 mg; manufactured by NITTO KASEI CO., LTD.) with tetrahydrofuran (10 mL) was added dropwise to the mixed solution while paying attention to heat generation, and the solution thus obtained is stirred at a room temperature for 12 hours. The formula for the reaction is as shown below. The reaction solution was concentrated under reduced pressure and the obtained crude product was purified by being subjected to silica gel column chromatography (eluent:ethyl acetate to ethyl acetate:methanol=4:1), so that a compound represented by Formula (1-1) [compound (1-1)] was obtained (30 g, yield 83%). With nuclear magnetic resonance ($^1$H NMR), it was confirmed that the obtained compound was a target product.

$^1$H NMR (methanol-$d_4$, 400 MHz) δ: 1.93 (6H, s), 2.35 (3H, s), 2.71 (4H, t), 3.39 (4H, t), 4.10-4.19 (8H, m), 5.62 (2H, s), 6.12 (2H, s).

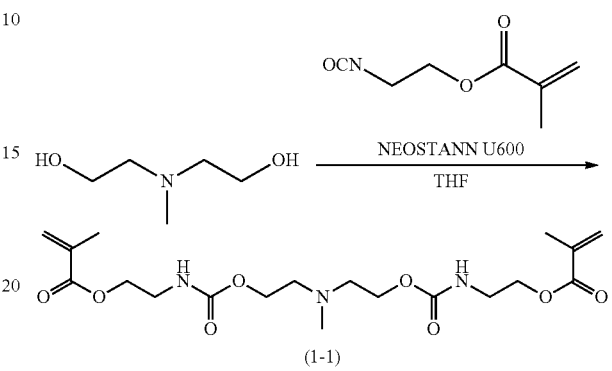

(1-1)

As a synthesis method of the compound (1-1), the following conditions can also be used to carry out the same synthesis as in the method described above.

N-methyldiethanolamine (7 g, 58.7 mmol), tetrahydrofuran (100 mL), and 2-isocyanatoethyl methacrylate (19.6 g, 126 mmol) were mixed and stirred at a room temperature for 24 hours. The reaction solution was concentrated under reduced pressure and the obtained crude product was purified by being subjected to silica gel column chromatography (eluent:ethyl acetate to ethyl acetate:methanol=9:1), so that a compound represented by Formula (1-1) (in the present specification, referred to as a "compound (1-1)") was obtained (21 g, yield 85%).

2. Preparation of Cured Film-Forming Composition

The synthesized compound (1-1) (containing 30 ppm of 4-hydroxy-2,2,6,6-tetramethylpiperidine-1-oxyl (4OH-TEMPO) as a polymerization inhibitor), a polymerization initiator, and a solvent were blended in the blending amount shown in Table 1, and a cured film-forming composition (hereinafter, sometimes referred to as a "cured film-forming composition 1") was prepared.

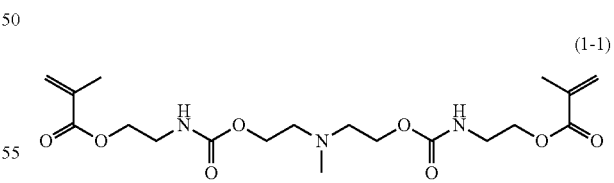

(1-1)

3. Production of Cured Film

The prepared cured film-forming composition 1 was applied onto the polyethylene terephthalate (PET) film (Cosmo shine A4300, manufactured by TOYOBO CO., LTD.; double-sided easy-adhesion treated PET film) while adjusting clearance by using a bar coater such that the thickness after drying was 3 μm, and then dried to form a cured film precursor film.

After that, the cured film precursor film was exposed at the exposure amount of 2 J/cm$^2$ by using an ultraviolet exposure machine (ECS-401G, manufactured by EYE-GRAPHICS Co., Ltd.; light source was a high-pressure mercury lamp), so that a cured film was produced on the PET film.

<Evaluation of Adhesiveness>

1. Platelet Adhesiveness

A platelet adhesion experiment was conducted by using the produced evaluation sample (sample 1) and a PET film (DIAFOIL T100E125, manufactured by Mitsubishi Chemical Corporation) as a control sample. Platelet-rich plasma and platelet-poor plasma were recovered by centrifugation from human whole blood anticoagulated with sodium citrate, and platelet-rich plasma was diluted with platelet-poor plasma, thereby preparing a platelet suspension of $4 \times 10^7$ cells/mL. Subsequently, each sample surface came into contact with the platelet suspension at 37° C. for 60 minutes, and then was rinsed twice with a phosphate buffer solution. Then, the platelets which have adhered to each sample surface were fixed with a 1% glutaraldehyde solution. Each sample subjected to fixing treatment was washed by being immersed in a phosphate buffer solution for 10 minutes, a 1:1 mixed solution of a phosphate buffer solution and water for 8 minutes, water for 8 minutes, and water again for 8 minutes, and dried with air at a room temperature. After that, the number of the platelets which have adhered to each sample surface of $1 \times 10^4$ μm$^2$ was observed with an electron microscope, and the number of platelets which have adhered was measured.

In a case where the total number of platelets which have adhered to the PET film (control sample) was set to 100%, the relative number of platelets in the sample 1 was calculated, and the platelet adhesiveness was evaluated according to the following criteria.

A: 3% or less
B: more than 3% and 5% or less
C: more than 5% and 20% or less
D: more than 20%

2. Fibroblast Adhesiveness

A fibroblast adhesion test was conducted by using, as evaluation substrates, the produced cell adhesion sheet (sample 1) and a PET film (DIAFOIL T100E125, manufactured by Mitsubishi Chemical Corporation) as a control sample. After the surface of each substrate was washed with phosphate buffered saline, each substrate was immersed at 37° C. for 60 minutes in a 1:1 mixed medium of Dulbecco's Modified Eagle's Medium and Ham's F-12 medium (DMEM/F12 medium) prepared by adding fetal bovine serum by 10%, thereby acclimating the substrate. After that, normal human dermal fibroblasts (NHDF) suspended in the above medium were seeded into each sample at a density of $1 \times 10^4$ per 1 cm$^2$, thereby bringing the suspension and each sample into contact with each other at 37° C. for 60 minutes. Subsequently, the substrates were rinsed twice with a phosphate buffer solution, and the cells which have adhered to each substrate were fixed with a 4% paraformaldehyde solution. The cell nucleus was stained with 4',6-diamidino-2-phenylindole (DAPI) and the actin skeleton was stained with phalloidin antibody, and the number of cells which have adhered was measured using a fluorescence microscope.

In a case where the total number of fibroblasts which have adhered to the PET film (control sample) was set to 100%, the relative number of fibroblasts in the sample 1 was calculated, and the fibroblast adhesiveness was evaluated according to the following criteria.

A: 3% or less
B: more than 3% and 5% or less
C: more than 5% and 20% or less
D: more than 20%

Example 2

<Production of Evaluation Sample>

A compound represented by Formula (1-2) [compound (1-2)] was synthesized, and a cured film-forming composition (hereinafter, sometimes referred to as a "cured film-forming composition 2") was prepared with composition shown in Table 1.

By using the cured film-forming composition 2, an evaluation sample (hereinafter, sometimes referred to as a "sample 2") was produced in the same manner as in Example 1.

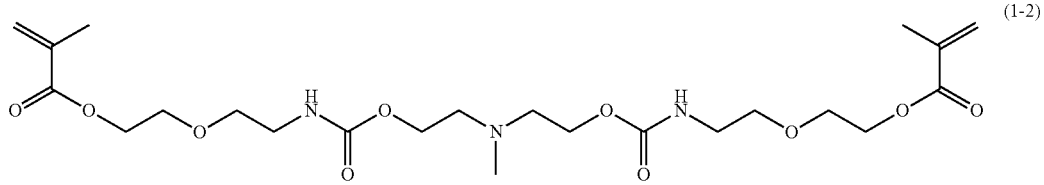 [SMILES: C=C(C)C(=O)OCCOCCNC(=O)OCCN(C)CCOC(=O)NCCOCCOC(=O)C(=C)C]

(1-2)

<Evaluation of Adhesiveness>

By using the produced evaluation sample (sample 2), platelet adhesiveness and cell [normal human dermal fibroblast (NHDF)] adhesiveness were evaluated in the same manner as in Example 1. The evaluation results are shown in Table 2.

Example 3

<Production of Evaluation Sample>

A compound represented by Formula (1-3) [compound (1-3)] was synthesized, and a cured film-forming composition (hereinafter, sometimes referred to as a "cured film-forming composition 3") was prepared with composition shown in Table 1.

By using the cured film-forming composition 3, an evaluation sample (hereinafter, sometimes referred to as a "sample 3") was produced in the same manner as in Example 1.

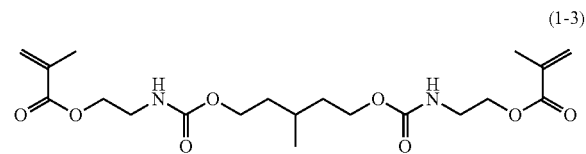 [SMILES: C=C(C)C(=O)OCCNC(=O)OCCC(C)CCOC(=O)NCCOC(=O)C(=C)C]

(1-3)

<Evaluation of Adhesiveness>

By using the produced evaluation sample (sample 3), platelet adhesiveness and cell [normal human dermal fibroblast (NHDF)] adhesiveness were evaluated in the same manner as in Example 1. The evaluation results are shown in Table 2.

Comparative Example 1

Production of Evaluation Sample

A compound represented by Formula (A) (hereinafter, sometimes referred to as a "compound A") was synthesized, and a cured film-forming composition (hereinafter, sometimes referred to as a "cured film-forming composition 4") was prepared with composition shown in Table 1.

By using the cured film-forming composition 4, an evaluation sample (hereinafter, sometimes referred to as a "sample 4") was produced in the same manner as in Example 1.

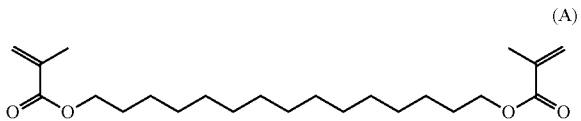 [SMILES: C=C(C)C(=O)OCCCCCCCCCCCCCCCOC(=O)C(=C)C]

(A)

<Evaluation of Adhesiveness>

By using the produced evaluation sample (sample 4), platelet adhesiveness and cell [normal human dermal fibroblast (NHDF)] adhesiveness were evaluated in the same manner as in Example 1. The evaluation results are shown in Table 2.

Comparative Example 2

By using a polyethylene terephthalate (PET) film (DIAFOIL T100E125, manufactured by Mitsubishi Chemical Corporation) as an evaluation sample (hereinafter, sometimes referred to as a "sample 5"), platelet adhesiveness and cell [normal human dermal fibroblast (NHDF)] adhesiveness were evaluated in the same manner as in Example 1. The evaluation results are shown in Table 2.

TABLE 1

|  |  | Example | | | Comparative Example |
|---|---|---|---|---|---|
|  |  | 1 | 2 | 3 | 1 |
| Compound | Compound (1-1) | 19.40 | | | |
|  | Compound (1-2) | | 19.40 | | |
|  | Compound (1-3) | | | 19.63 | |
|  | Compound (A) | | | | 19.63 |
| Polymerization initiator | PI-1 | 0.60 | 0.60 | | |
|  | Irg1173 | | | 0.37 | 0.37 |
| Solvent | Methanol | 80.00 | 80.00 | | |
|  | Acetone | | | 80.00 | 80.00 |
| Total |  | 100.00 | 100.00 | 100.00 | 100.00 Parts by mass |

In Table 1, PI-1 in the column of polymerization initiator represents a photopolymerization initiator (a compound represented by the following formula), and Irg1173 represents a photopolymerization initiator (Omnirad 1173, manufactured by IGM Resins).

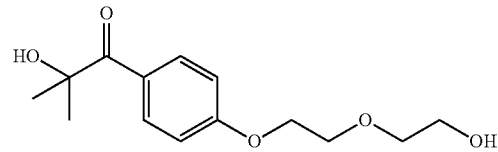 [SMILES: CC(C)(O)C(=O)c1ccc(OCCOCCO)cc1]

As PI-1, a compound obtained by synthesis with reference to the method described in paragraphs [0105] to [0110] of WO2017/018146A was used.

TABLE 2

|  | Example | | | Comparative Example | |
|---|---|---|---|---|---|
|  | 1 | 2 | 3 | 1 | 2 |
| Sample | 1 | 2 | 3 | 4 | 5 |
| Platelet adhesiveness | A | A | B | C | D |
| Cancer cell adhesiveness | A | B | A | C | D |

The evaluation samples of Examples 1 to 3 well suppressed the adhesion of platelets and the adhesion of cells.

Among them, the evaluation sample of Example 1 better suppressed the adhesion of platelets and the adhesion of cells.

What is claimed is:

1. A composition which is used to form a cured film that is disposed on a medical device, the composition comprising:

a compound represented by Formula (1),

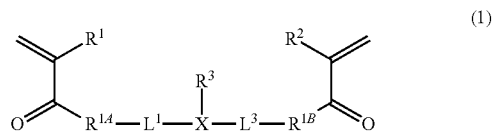

(1)

in Formula (1), $R^1$ and $R^2$ each independently represent a hydrogen atom or an alkyl group, $R^3$ represents an alkyl group, $R^{1A}$ and $R^{1B}$ each independently represent an oxygen atom or $—NR^{101}—$, where $R^{101}$ represents a hydrogen atom or an alkyl group, $L^1$ and $L^3$ each independently represent an aliphatic hydrocarbon group which contains a urethane bond represented by $—NH—COO—*1$ and which may contain an ether bond, and X represents a nitrogen atom, and the urethane bond in the aliphatic hydrocarbon group represented by $L^1$ is bonded such that *1 is on an X side, and the urethane bond in the aliphatic hydrocarbon group represented by $L^3$ is bonded such that *1 is on the X side.

2. The composition according to claim 1, wherein $R^3$ is an alkyl group having 4 or less carbon atoms.

3. The composition according to claim 2, wherein RIA and R 1B are an oxygen atom.

4. The composition according to claim 1, wherein RIA and RIB are an oxygen atom.

5. The composition according to claim 1, wherein the compound represented by Formula (1) is one selected from the group consisting of compounds represented by Formulae (1-1) to (1-2),

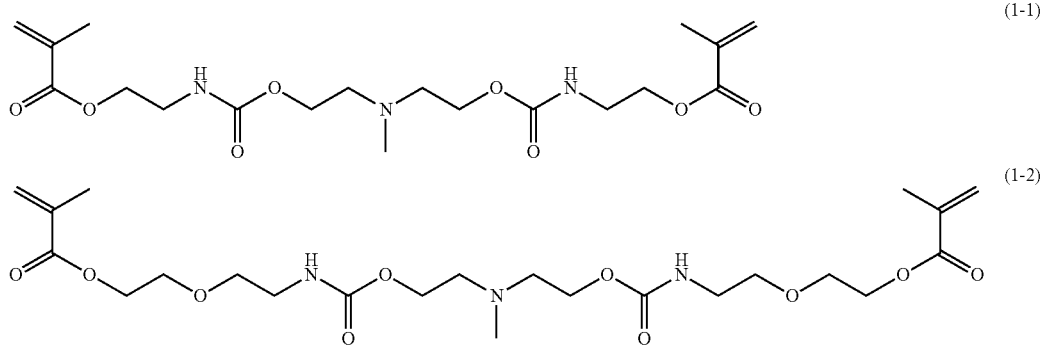

(1-1)

(1-2)

6. A medical device with a cured film, comprising:
a medical device; and
a cured film disposed on the medical device and formed of the composition according to claim 2.

7. A medical device with a cured film, comprising:
a medical device; and
a cured film disposed on the medical device and formed of the composition,
wherein the composition comprises a compound represented by Formula (1),

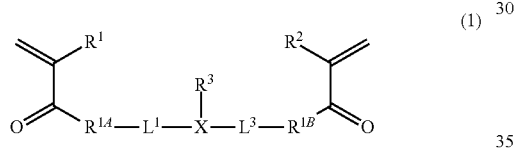

(1)

in Formula (1), $R^1$ and $R^2$ each independently represent a hydrogen atom or an alkyl group, $R^3$ represents an alkyl group, $R^{1A}$ and $R^{1B}$ each independently represent an oxygen atom or $-NR^{101}-$, where $R^{101}$ represents a hydrogen atom or an alkyl group, $L^1$ and $L^3$ each independently represent an aliphatic hydrocarbon group which contains a urethane bond represented by $-NH-COO-$*1 and which may contain an ether bond, and X represents a nitrogen atom or $>CR^{102}-$, where $R^{102}$ represents a hydrogen atom or a monovalent substituent, and the urethane bond in the aliphatic hydrocarbon group represented by $L^1$ is bonded such that *1 is on an X side, and the urethane bond in the aliphatic hydrocarbon group represented by $L^3$ is bonded such that *1 is on the X side.

8. The medical device with a cured film according to claim 7,
wherein the cured film is an antithrombotic film.

* * * * *